United States Patent
Durham

[19]

[11] Patent Number: 6,161,587
[45] Date of Patent: Dec. 19, 2000

[54] SHIELD AND METHOD FOR EXPOSING HIGH VOLTAGE POWER LINES AND THE LIKE

[76] Inventor: Roland G. Durham, 1444 W. Plana, Mesa, Ariz. 85202

[21] Appl. No.: 09/481,179

[22] Filed: Jan. 12, 2000

[51] Int. Cl.[7] ..................................................... F16L 55/18
[52] U.S. Cl. ......................... 138/97; 138/98; 405/150.1; 228/119
[58] Field of Search ............................. 138/97, 98, 110; 405/149, 150.1; 228/119

[56] References Cited

U.S. PATENT DOCUMENTS

| | | | |
|---|---|---|---|
| 4,175,593 | 11/1979 | Sack | 138/110 |
| 4,413,765 | 11/1983 | Tracy | 138/97 X |
| 4,605,155 | 8/1986 | Duesberg et al. | 138/97 X |
| 5,368,075 | 11/1994 | Baro et al. | 138/97 X |
| 5,464,141 | 11/1995 | Brindle | 224/328 |
| 5,560,397 | 10/1996 | Miller et al. | 138/110 |
| 5,915,420 | 6/1999 | Dwight, Jr. et al. | 138/97 X |
| 6,092,553 | 7/2000 | Hodgson | 138/97 |

Primary Examiner—Patrick Brinson
Attorney, Agent, or Firm—John D. Lister

[57] ABSTRACT

A tubular shield for exposing underground electrical power lines (especially high voltage power lines), telecommunication lines, cable television lines, fiber optic lines and the like, housed within tubular conduits, has an external diameter less than the internal diameter of the tubular conduits with which the shield is to be used and, for most applications, is provided with a longitudinally extending slot that extends for the entire length of the shield and provides an opening greater in width than the diameter of the line(s) housed within the tubular conduit. To expose a power, telecommunication, cable TV, fiber optic line or the like, that is housed within a conduit, a longitudinally extending slot is cut into the tubular conduit. The tubular shield is then inserted into the tubular conduit through the slot and underneath the line(s) within the tubular conduit to provide a shield between the line(s) and the tubular conduit. The tubular conduit is then cut with a cable saw or similar cutting tool and a section of the conduit is severed from the remainder of the conduit. The conduit and the shield are then removed from about the line(s), with the line(s) passing through the slots in the conduit section and the shield, to expose the line(s).

21 Claims, 3 Drawing Sheets

SHIELD AND METHOD FOR EXPOSING HIGH VOLTAGE POWER LINES AND THE LIKE

BACKGROUND OF THE INVENTION

This invention relates to underground power (especially high voltage power lines), telecommunication, cable television, fiber optic lines and the like and, in particular, to a shield used to expose such underground lines without damage to the lines or injury to the workers and the method of utilizing the shield to expose the underground lines.

Underground high voltage power lines, telecommunication lines (e.g. telephone lines), cable television lines, fiber optic lines and the like are normally housed within conventional standard size plastic conduits (e.g. pvc conduits) and sections of these conduits must be removed from about the lines to expose the lines prior to working on the lines. These underground power lines (especially high voltage power lines), telecommunication lines, cable television lines, fiber optic lines and the like, generally, must be replaced, when the insulation sheath about the wiring or optic fibers within the lines becomes cut or otherwise damaged, to avert a premature line failure while the line is placed in service. The replacement of these lines can be quite costly in time, labor and materials, especially for the replacement of high voltage power lines and fiber optic lines which are expensive. Thus, it is important to avoid damage to these lines when a conduit section is being removed from about the lines to expose the lines so that the lines can be worked on.

It is also very important to avoid injury to the workers through electrical shock, especially, when working with high voltage power lines. Frequently, when a section of conduit is being removed from about a line to expose the line within the conduit, the workers do not know whether or not the electrical power to the line has been shut off. In some cases, with multiple underground lines, the only way to absolutely determine whether or not the electrical power to the line has been shut off is to spike the line after the line has been exposed. Thus, while the workers are uncertain whether or not they are dealing with a live line, it is important to shield the workers from electrical shock to prevent injury to the workers.

By way of example, during the construction of shopping malls, industrial complexes, commercial buildings, and similar relatively large building projects, new or existing, buried or underground high voltage power lines or electrical cables have to be tapped into, spliced or otherwise worked on to provide electrical services to the project. Typically, there will be several different tubular conduits closely grouped together, within a trench, that each contain a different high voltage power line or electrical cable. Before one of these high voltage underground power lines can be tapped into, spliced or otherwise worked on, a length of one of the power lines to be tapped, spliced or otherwise worked on must be exposed by removing a section of one of the tubular conduits from about the power line. Due in part to the confined space within which the work must be performed and the presence of other power line containing conduits closely positioned about the conduit containing the power line to be worked on, the task of removing a portion or section of the conduit housing the power line to be worked on can be quite difficult to perform, especially without damaging the power line within the conduit or exposing the workers to possible electrical shock as the section of conduit is being cut away. As mentioned above, any damage to the insulation sheath of the high voltage power line or electrical cable within the conduit while removing the section of conduit may necessitate the replacement of a great length or portion of the high voltage power line. The cost for the replacement of one of these costly high voltage power lines, plus the added time and labor costs required to replace such a high voltage power line, can greatly increase the cost of tapping into, splicing or otherwise working on a high voltage power line. Thus, it is most beneficial to avoid damage to a high voltage power line when the conduit housing a high voltage power line is being cut away to expose the high voltage power line for both cost and safety reasons.

Once a high voltage power line has been exposed, the power line is checked to determine if the electrical power to the power line has actually been turned off prior to working with the power line. Otherwise, if the electrical power to the power line has not been turned off, anyone working with the power line would most likely be seriously injured if not killed. Typically, the power line is tested to determine if the electrical power to the power line has been turned off by spiking the power line with a spiking clamp (such as, a spiking clamp made by Hastings of Hastings, Michigan). The spiking clamp has a threaded spike with a pointed end that is used to penetrate the insulating casing of the power line and make contact with the wiring within insulating casing of the power line. The threaded spike is grounded and an eye on the second end of the threaded spike is turned with a shotgun stick (such as, a shotgun stick sold by Hastings of Hastings, Michigan) to cause the spike to penetrate the insulating casing and make contact with the wiring within the insulating casing. If the power line is hot (the electrical power to the power line has not been turned off) the contact of the spike of the spiking clamp with the wiring of the power line normally causes an eruption of hot flame from the power line at the location of the spike.

SUMMARY OF THE INVENTION

The shield of the present invention solves the above discussed problems associated with exposing underground electric power and communication lines for tapping, splicing or otherwise working on the power and communication lines by protecting lines within a conduit from damage when a portion of the conduit housing the line is being cut away to expose the line. The tubular shield of the present invention is made of an electrically nonconductive material or includes a layer of electrically nonconductive material, and, for most applications, has a longitudinally extending slot that extends for the entire length of the tubular shield. The slot in the tubular shield has a width greater than the external diameter of the line within the conduit so that the line can readily pass through the slot into and out of the shield. The tubular shield has an external diameter less than the internal diameter of the size conduit with which the shield is to be used so that the tubular shield can be easily inserted into the conduit through a longitudinally extending slot in the conduit, easily rotated within the conduit to pass underneath the power line housed within the conduit, and easily moved within the conduit in the direction of the longitudinal axis of the conduit to properly position the shield to protect the line within the conduit when a section of the conduit is cut out of the conduit to expose the line.

The method of the present invention for exposing a power or communication line housed within a conduit without damaging the line or injuring the worker, typically, involves cutting a longitudinally extending slot into an upper portion of the conduit that is greater in width than the external diameter of the power line so that the power line can pass through the conduit slot. The tubular shield of the present invention, having a slot extending longitudinally for the entire length of the tubular shield with a width greater than the external diameter of the line within the conduit so that the line can pass through the shield slot into the shield and out of the shield, and having an external diameter less than the internal diameter of the conduit, is then inserted into the conduit through the conduit slot, easily rotated within the conduit to pass underneath the line housed within the conduit, and easily moved by hand in either direction within the conduit, if needed, to properly position the shield to protect the line when a section of the conduit is cut out of the conduit to expose the line. The conduit is then cut circumferentially at two spaced apart locations intersecting the conduit slot, with the shield positioned intermediate the conduit and the line when and where the cuts are made, to completely separate or sever a section of the conduit from the remainder of the conduit. The severed conduit section is then removed along with the shield from about the line by passing the line through the shield slot and the conduit slot to thereby create an open gap in the conduit and expose the line.

DESCRIPTION OF THE PREFERRED EMBODIMENTS

Figure 1:
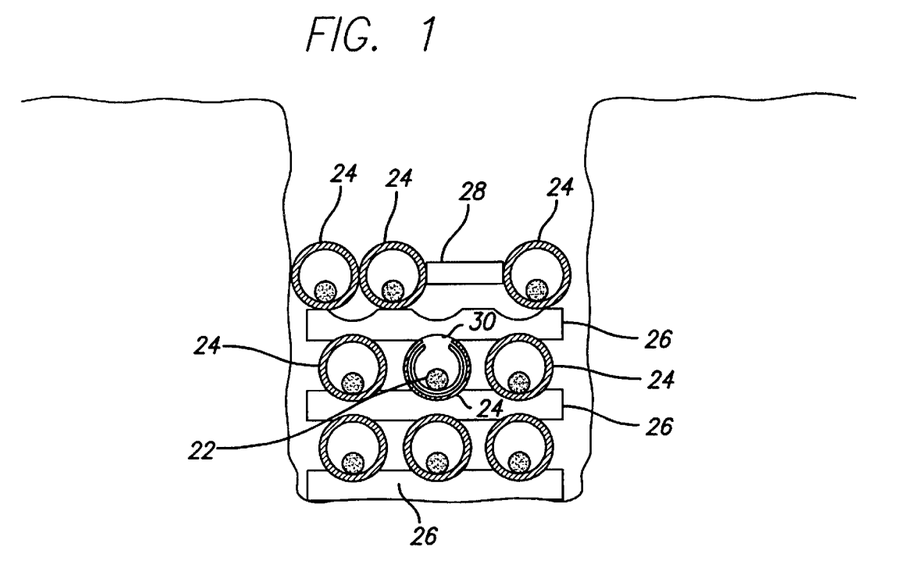
FIG. 1 is a schematic cross section through a trench containing underground lines, e.g. high voltage power lines, to schematically illustrate a first embodiment of the shield of the present invention in use.

FIG. 1 schematically shows a first embodiment 20 of the shield of the present invention being used to expose an underground power or communication line 22, such as an underground power line, high voltage power line, telecommunication line, cable television line, fiber optic line or the like. As shown, there is a grouping of nine different conduits 24, each containing a different line 22, in a trench. The conduits 24 used in the industry to house power and communication lines 22 are manufactured in standard sizes having internal diameters of one inch, one and one half inches, two inches, two and one half inches, three inches, three and one half inches, four inches, five inches, six inches and so on up to two feet or more in diameter (hereinafter "standard sized conduits"). Typically, the conduits 24 are made up of twenty foot sections which are coupled together with conventional couplings used in the industry. While the conduits 24 are typically positioned and supported on spacers 26, the conduits 24 are still located in very close proximity to one another so that it can be quite difficult to cut away a section of a conduit, housing a particular power or communication line, within the grouping of conduits to work on the particular line 22. As shown, a power or communication line 22 in a centrally located conduit 24 is to be exposed and, to do that, one or more blocks of wood or other spacers 28 have been used to spread apart two of the upper conduits 24 to gain access to the conduit 24 to be opened to expose the line 22 to be worked on. A slot 30 has been cut through an upper portion of the conduit housing the power or communication line to be exposed and the shield 20 has been inserted into the conduit 24, rotated to pass beneath the power line 22 within the conduit, and positioned within the conduit 24 to protect the power or communication line when a section of the conduit 24 is cut away from the remainder of the conduit to create a gap in the conduit that exposes the power or communication line 22.

Figures 2, 11:
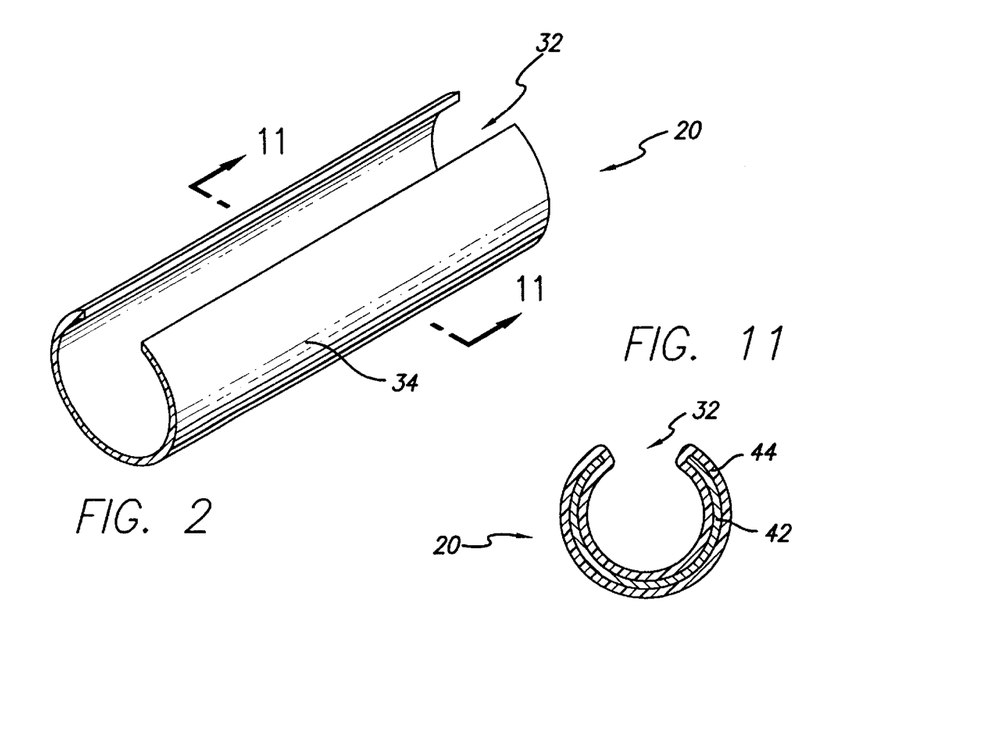
FIG. 2 is a schematic perspective view of the first embodiment of the shield of the present invention.
FIG. 11 is a schematic transverse cross section of the shield of FIG. 2, taken substantially alone lines 11—11 of FIG. 2.

The shield used in FIG. 1 to protect the power or communication line 22 is shown in FIG. 2. As shown, the shield 20 is tubular with a round or substantially round transverse cross section. The tubular shield 20 has a longitudinally extending slot 32 therein that extends for the entire length of the shield sidewall. The width of the slot 32 is greater than the external diameter of the power or communication line 22 within the conduit (e.g. preferably, a width about one quarter to about one half of an inch greater for use with conduits having internal diameters of about three inches or less; about one half of an inch to about one and one half inches greater for use with conduits having internal diameters ranging from about three and one half to six inches; and about one to one and one half inches or greater for use with conduits having internal diameters greater than six inches) so that the power or communication line can pass easily into and out of the shield through the slot 32. The external diameter of the shield 20 is less than the internal diameter of the size conduit 24 with which the shield 20 is to be used to protect the line(s) within the conduit from damage and the worker from electrical shock, during the removal of a section of the conduit to expose the line, so that the shield 20 can be easily inserted by hand into the conduit through a slot, such as the slot 30; easily rotated by hand within the conduit to pass between the conduit 24 and the line(s) 22; and easily moved by hand either way in the direction of the longitudinal axis of the conduit to properly position the shield 20 for the circumferential cutting of the conduit to remove a section of the conduit and expose the power line.

Since, in use, the shield 20 is rotated within the conduit 24 to pass beneath the power or communication line 22 within the conduit, the shield, once inserted into the conduit and rotated to pass beneath the power or communication line within the conduit, normally rests on or in contact with a bottom portion of the conduit. However, to illustrate the preferred relative external diameter of the shield 20 to the internal diameter of a conduit 24 with which the shield is to be used, if the shield 20 were concentrically located within the size conduit with which the shield is to be used, there would be a gap or clearance between the external surface 34 of the shield 20 and the internal surface 36 of the conduit 24 extending completely around the circumference of the shield. This permits the shield 20 to be easily and readily rotated within and moved axially within the conduit by hand without interference. For example, a shield 20, to be used with a conduit 24 having an internal diameter of three inches or less, preferably, has an external diameter about one quarter on an inch or more less than the internal diameter of the conduit. A shield 20, to be used with a conduit 24 having an internal diameter three and one half inches to six inches, preferably, has an external diameter about one half of an inch to about one and one-half inches less than the internal diameter of the conduit. A shield 20, to be used with a conduit 24 having an internal diameter greater than six inches, preferably, has an external diameter about one inch to about two inches or more less than the internal diameter of the conduit.

The tubular shield 20 is made entirely of an electrically nonconductive material or includes an electrically nonconductive layer or coating on and coextensive with the interior and/or exterior surfaces of the tubular shield sidewall. Preferably, at least the portion of the tubular shield 20 forming the exterior sidewall surface of the shield, e.g. an outer layer or coating, is harder than the material [typically polyvinyl chloride (pvc) plastic] forming the conduit 24 so that the shield 20 is harder to cut than the conduit 24. Such harder materials for the exterior sidewall surface of the tubular shield 20 include but are not limited to metal alloys, aluminum, stainless steel, a harder plastic than that from which the conduit 24 is made, and ceramic materials. FIG. 11 schematically shows a transverse cross section through a preferred embodiment of the tubular shield 20 which has a metallic tubular core 42, e.g. an extruded aluminum core, that is completely encased within a coating or layer 44 of an electrically nonconductive material, e.g. preferably a hard ceramic material. The coating or layer 44 of electrically nonconductive material may be applied to the metallic core 42 by immersing the metallic tubular core 42 (preferably, completely, including both ends of the core) within a liquid or molten pool of the electrically nonconductive material to coat or apply a layer of the electrically nonconductive material onto the core that preferably completely encases the core; removing the coated core from the pool; and then, permitting the coating or layer 44 of electrically nonconductive material to harden on the metallic tubular core by cooling and/or drying.

The thickness of the tubular sidewall of the shield 20 is, preferably, about ¼ of an inch or more for shield diameters greater than three inches and about ⅛ of an inch for shield diameters of three inches or less. The length of the shield 20 can vary but, preferably, the shield 20 will have a length ranging from six inches to thirty six inches; more preferably a length ranging from sixteen to thirty inches; and, most preferably, a length ranging from eighteen to twenty four inches. The shield 20 is of sufficient length to be easily positioned, preferably without too much axial movement of the shield, to protect the line within a conduit when and where the two circumferential cuts are made to remove a section of the conduit to create the size gap required to work on the exposed line.

FIGS. 3–7 schematically illustrate the method of the present invention for exposing a power or communication line 22 housed within a conduit 24 without damaging the line 22. While one end of the line 22 and the conduit 24 are shown in cross section in FIGS. 3–7, this is for illustrative purposes only and it is to be understood that typically the power or communication line 22 and the conduit 24 would be continuous and could extend for a long distance on either side of the location where the tap, splice or other work on the line 22 is to be performed. To expose a length of the power or communication line 22 within the conduit 24, the longitudinally extending slot 30 is first cut into and through an upper portion of the conduit 24, normally with a PVC-cable saw or a similar cutting tool. Since the line 22 generally rests on the bottom portion of the conduit 24, the slot 30 can be easily made in the upper portion of the conduit without any undue risk of damage to the power line 22 or electrical shock to the worker. As set forth above, the conduit slot 30 formed is greater in width than the external diameter of the line 22 so that the line can readily pass through the conduit slot 30. The conduit slot 30 typically has a length approximately equal to the length of the gap 38 to be made in the conduit 24 by the removal of a severed conduit section 40, e.g. about 18 to 24 inches, and is longer in length than the length of the shield so that the shield 20 can be easily inserted into the conduit through the slot 30.

Figures 3, 4:
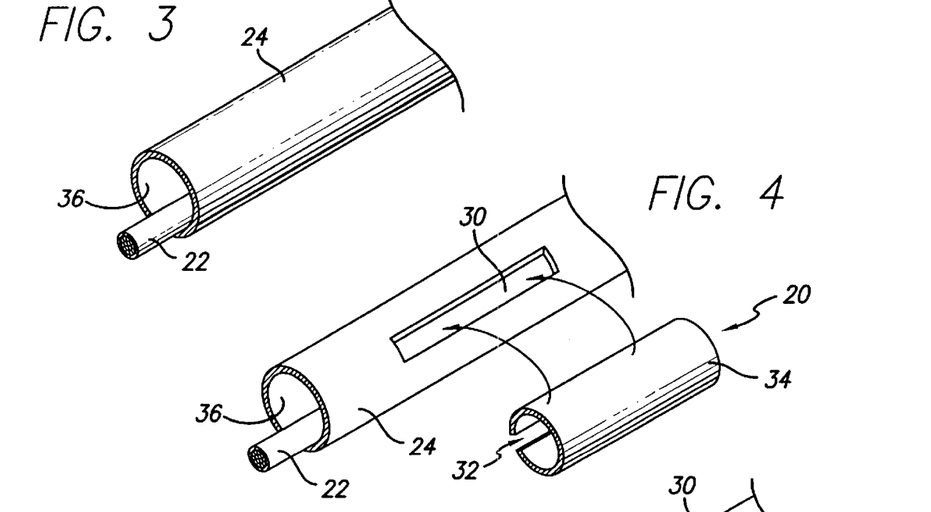
FIG. 3 is a schematic perspective view of a portion of a conduit housing a power or communication line.
FIG. 4 is a schematic perspective view of the conduit of FIG. 3 with a slot cut into the conduit to permit insertion of the first embodiment of the shield of the present invention into the conduit.
Figures 5, 6, 7:
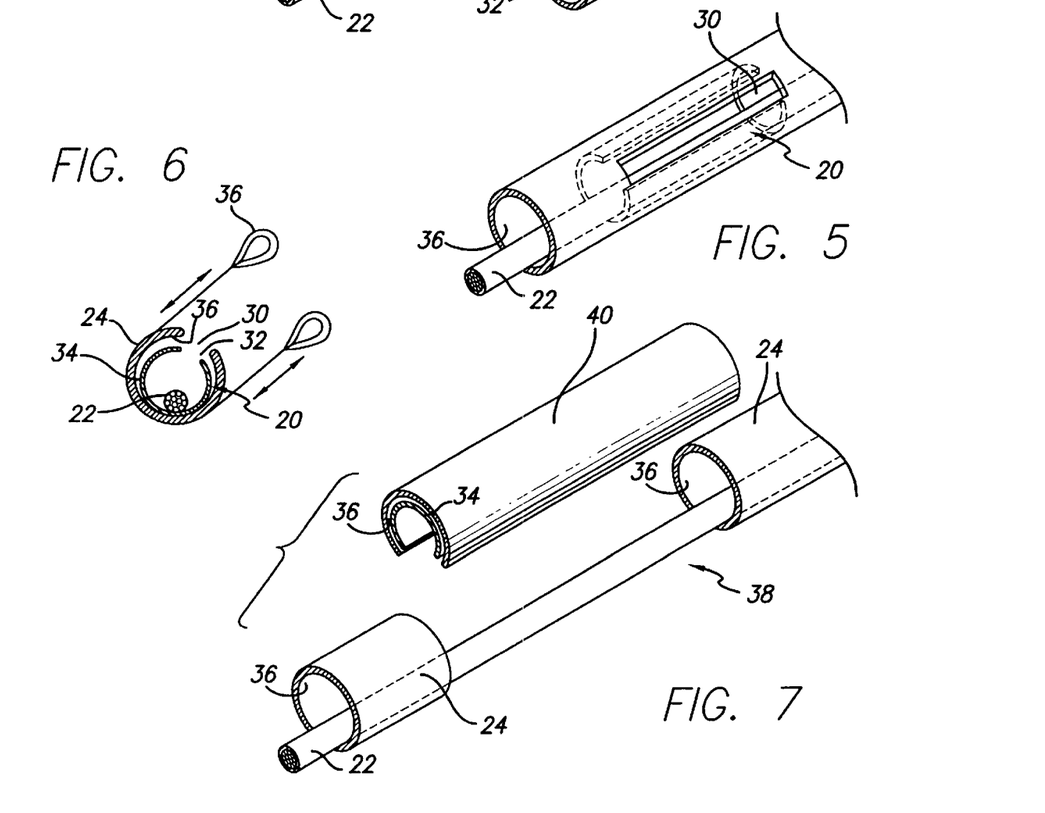
FIG. 5 is a schematic perspective view of the conduit with the first embodiment of the shield of the present invention, shown in phantom line, within the conduit and protecting the power or communication line so that a section of the conduit can be severed from the remainder of the conduit to expose the line.
FIG. 6 is a schematic cross section taken substantially along lines 6—6 of FIG. 5 to illustrate a cable saw cutting through the conduit while the power or communication line is protected by the shield of the present invention.
FIG. 7 is a schematic perspective view of the conduit of FIGS. 3–6 with a section of the conduit removed and the power or communication line exposed.

After the slot 30 has been cut into the conduit 24, as shown in FIGS. 4 and 5, a tubular shield 20 is selected having: a) a longitudinally extending slot 32 extending for the entire length of the tubular shield that, as set forth above, has a width greater than the diameter of the line 22 within the conduit 24 so that the line can pass through the shield slot 32 into the shield and out of the shield; and b), as set forth above, an external diameter less than the internal diameter of the conduit 24 so that the shield 20 can be easily rotated by hand within the conduit to pass underneath the line 22 housed within the conduit 24 and be positioned by hand either way in the direction of the longitudinal axis of the conduit to protect the line when and where the circumferentially extending cuts are made to sever a section of the conduit 40 from the remainder of the conduit 24 to expose the line. This shield 20 is inserted into the conduit through the slot 30; rotated, typically by hand, to pass underneath and come between the line 22 and the conduit 24; and positioned in the direction of the longitudinal axis of the conduit, by moving the shield, typically by hand, in the direction of the longitudinal axis of the conduit if necessary, for the first circumferentially extending cut. With the shield 20 intermediate the conduit 24 and the line 22 at the location of the cut, the conduit 24 is then cut circumferentially with a cable saw 36 or similar cutting tool as shown in FIG. 6, at the first location with the cut intersecting or crossing the slot 30 to completely sever the conduit 24 at this first location. Next, the shield 20 is shifted or moved in the direction of the longitudinal axis of the conduit 24, if required, to be intermediate the conduit and the line 22 at a second location, spaced from the first location, where a second circumferentially extending cut is to be made to completely sever a section of the conduit 40 from the remainder of the conduit 24 and form a gap 38 in the conduit. With the shield 20 intermediate the conduit and the line at the location for the second circumferential cut, the conduit 24 is then cut circumferentially with a cable saw 36 or similar cutting tool as shown in FIG. 6, at the second location with the cut intersecting or crossing the slot 30 to completely sever the conduit 24 at this second location. The severed conduit section 40, which, typically, is about the same length as the slot 30, is then removed along with the shield 20 from about the line 22 by passing the line through the shield slot 32 and the conduit slot 30 to form the gap 38 in the conduit 24 and expose the line as shown in FIG. 7.

Figure 8:
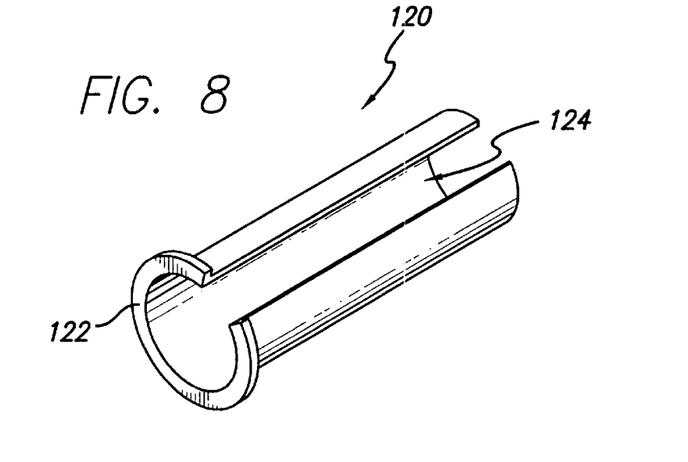
FIG. 8 is a schematic perspective view of a second shield of the present invention.

Should there be a need to extend the gap or opening 38 in the conduit 24 farther and expose more power or communication line 22 either prior to or subsequent to starting work on the line 22, a slot, like the slot 30, can be cut into the conduit beginning at an open end of the conduit and the tubular shield 120 of FIG. 8 can be passed over the line and slid into the conduit on the side of the gap where the additional slot has been cut. The conduit is then cut circumferentially with a cable saw or the like with the shield intermediate the line 22 and the conduit and the cut intersecting the additional cut. The severed section of conduit along with the tubular shield 120 can then be removed from about the line 22 by passing the line through the slots in the shield and severed section of conduit.

The tubular shield 120 is substantially the same as the tubular shield 20 with one exception, the tubular shield 120 has an annular flange 122 at one end. The annular flange 122 is interrupted by a longitudinally extending slot 124 and has an outer diameter greater than the interior diameter of a conduit with which the tubular shield 120 is to be used. The presence of the annular flange 122 limits the extent to which the shield 120 can be inserted into the end of a conduit 24.

As shown in FIG. 8, the shield 120 is tubular with a round or substantially round transverse cross section. The longitudinally extending slot 124 of the tubular shield 120 extends for the entire length of the shield sidewall. As with the slot 32 in the shield 20, the width of the slot 124 is greater than the external diameter of the power or communication line 22 within the conduit housing the line so that the line can pass easily into and out of the shield through the slot 32. As with the shield 20, the external diameter of the shield 120 is less than the internal diameter of conduits with which the shield is to be used to protect the lines housed within such conduits from damage during the removal of sections of the conduits to expose the lines so that the shield 120 can be easily inserted into the conduit through the ends of the conduits; easily rotated by hand within the conduits to pass between the conduits and the power or communication lines; and easily moved by hand either way in the direction of the longitudinal axis of the conduits to properly position the shield 120 for the circumferential cutting of the conduits to remove additional sections of the conduit and expose more of the lines. The external diameter of the shield 120 relative to the internal diameter of a conduit with which it is to be used is the same as the relative diameter of the tubular shield 20 to the diameter of such a conduit. Preferably, the shield 120 is made of the same materials as the shield 20. The thickness of the tubular sidewall of the shield 120 is, preferably, about ¼ of an inch for diameters greater than three inches and about ⅛ of an inch for shield diameters of three inches or less. The length of the shield 120 can vary but, preferably, the shield 120 will have a length ranging from six inches to thirty six inches; more preferably a length ranging from sixteen to thirty inches; and, most preferably, a length ranging from eighteen and twenty four inches so that the conduit can be circumferentially cut at a location spaced from the existing gap that enables the gap in the conduit to be expanded by an amount sufficient to expose the addition length of line required to perform the work.

Figure 9:
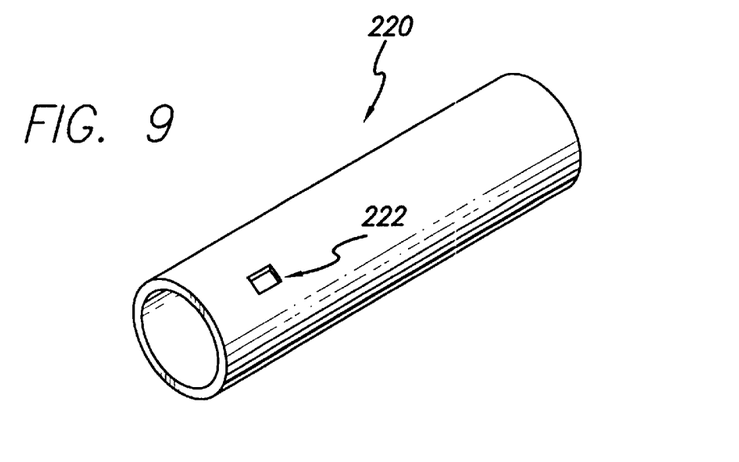
FIG. 9 is a schematic perspective view of a third shield of the present invention.

Once the power line 22 has been spiked and cut at the original gap 38, should there be a need to open up another gap in the conduit 24 at a second location along the conduit spaced from the gap 38, e.g a location several feet away to a location several hundred feet or more away, the tubular shield 220 of FIG. 9 can be used in the formation of such a second gap to expose the power or communication line at this second location. The tubular shield 220 is substantially the same as the tubular shield 20 with one exception, the tubular shield 220 does not have a longitudinally extending slot, but is provided with a notch or opening 222 in its sidewall for attaching a fish tape or other device to draw or pull the tubular shield 220 through a conduit.

As shown in FIG. 9, the shield 220 is tubular with a round or substantially round transverse cross section. As with the shield 20, the external diameter of the shield 220 is less than the internal diameter of conduits 24 with which the shield is to be used to protect the power or communication lines from damage during the removal of a section of the conduit to expose the lines so that the shield 220 can be easily inserted into the conduits through the ends of the conduits and easily moved through the conduits in the direction of the longitudinal axis of the conduits to properly position the shield for the circumferential cutting of the conduits to remove additional sections of conduit at the second locations remote from the first locations and expose the line at the second locations. The tubular sidewall of the shield 220 is provided with a notch or a hole 222 for receiving the hook of a "fish tape", wire or line, so that the tubular shield can be moved through a conduit.

The external diameter of the shield 220 relative to the internal diameter of a conduit with which it is to be used is the same as with the tubular shield 20. Preferably, the shield 220 is made of the same materials as the shield 20. The thickness of the tubular sidewall of the shield 220 is, preferably, about ¼ of an inch for diameters greater than three inches and about ⅛ of an inch for shield diameters three inches or less. The length of the shield 220 can vary but, preferably, the shield 220 will have a length ranging from six inches to thirty six inches; more preferably a length ranging from sixteen to thirty inches; and, most preferably, a length ranging from eighteen to twenty four inches.

After an initial gap 38 has been formed in a conduit or from an open end of a conduit, a power or communication line 22 within the conduit has been spiked or otherwise been determined to be without power, and in the case of the gap 38 the line has been severed at the gap, the tubular shield 220 can be used to form another gap in the conduit at a second location remote from the first or initial gap or end of the conduit. At the second location, a longitudinally extending slot, such as the slot 30, is cut into an upper portion of the conduit. As with the slot 30, this second slot has a width greater than the line within the conduit and a length preferably about equal to the length of the second gap to be formed in the conduit. A fish tape or similar line with a hook or similar means for attaching an end of the tape to the shield 220 is then fed through the conduit from the second slot to the first gap 38 or the open end of the conduit. The tubular shield 220 is placed over the free end of the line housed within the conduit; the hook or other attachment means of the fish tape or line is secured to the shield 220, e.g. by passing the hook through or securing the hook to the notch or opening 222 in the shield sidewall; the shield is slid into the open end of the conduit; and the tubular shield is pulled or drawn through the conduit to the second slot with the power line within the tubular shield. At the second slot, with the tubular shield intermediate the power or communication line and the conduit at the locations for the circumferentially extending cuts to be made in the conduit to sever another section of conduit from the conduit and expose the line, the conduit is cut circumferentially at two spaced apart locations with the cuts crossing or intersecting the second slot. The tubular shield 220 is then moved out of the way by moving the tubular shield into the remaining conduit outside the cuts and the newly severed section of conduit is removed from about the high line by passing the line through the second slot which is now in the severed section of conduit. The line can then be severed and the tubular shield can be grasped by a worker with his hand to remove or pull the tubular shield 220 from the newly open end of conduit and from about the line.

Groupings of conduits, called risers, are also generally present at these work locations. The risers project vertically from the ground, normally, passing vertically through and projecting upwardly above ground level from a concrete slab or pad, and carry or house power or communication lines which project from the upper ends of the conduits to thereby bring these services from the underground lines to the surface where the lines can be connected, as required for a project. These conduits are supposed to project above the upper surfaces of these concrete slabs about one to two inches. However, frequently, these conduits, as initially installed, project for a foot or more above the surfaces of these concrete slabs and, later, have to be cut off to the proper height before the free ends of the lines housed within and projecting from the conduits can be connected to the above ground service lines.

Figure 10:
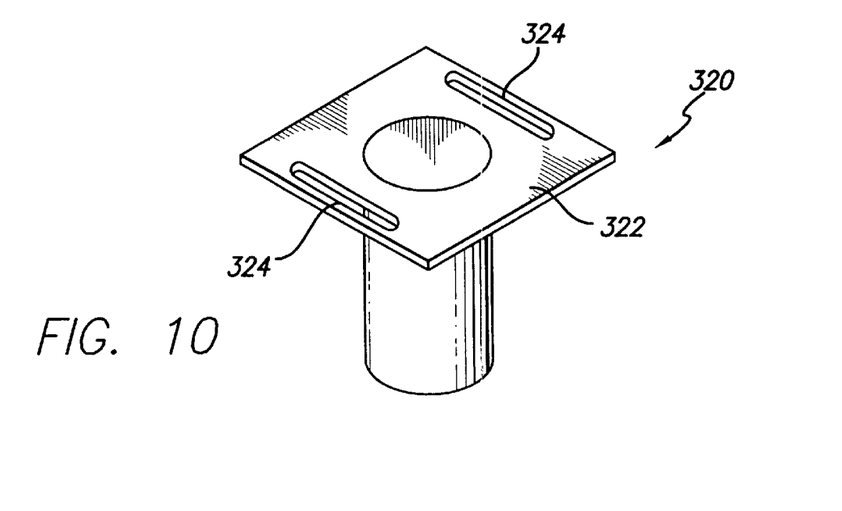
FIG. 10 is a schematic perspective view of a fourth shield of the present invention.

The tubular shield 320 of FIG. 10 provides a means to shield the power and communication lines within these vertically extending risers or conduits while these risers or conduits are trimmed to their proper height above the pad or slab.

As shown in FIG. 10, the shield 320 is tubular with a round or substantially round transverse cross section. As with the shield 20, the external diameter of the shield 320 is less than the internal diameter of conduits 24 with which the shield is to be used to protect the lines from damage during the removal of a section of the conduit to trim the conduits to the proper height above the pad or slab so that the shield 320 can be easily inserted into the conduits through the upper open ends of the conduits and easily moved down through the conduits in the direction of the longitudinal axis of the conduits to properly position the shield for the circumferential cutting of the conduits to remove the sections of the conduit from the vertically extending risers or conduits. The tubular shield 320 has an annular flange 322 projecting outward from an upper end of the shield that is greater in diameter than the internal diameter of the size conduit with which it is to be used so that the tubular shield can not totally pass down into the conduit and be lost. Preferably, the annular flange 322 projects outwardly from the end of the tubular shield 320 a distance sufficient to permit hand grips 324 to be located in the flange to facilitate the handling of the shield.

The external diameter of the tubular sidewall of the shield 320 relative to the internal diameter of the size conduit with which it is to be used is the same as with the tubular shield 20. Preferably, the shield 320 is made of the same materials as the shield 20. The thickness of the tubular sidewall of the shield 320 is, preferably, about ¼ of an inch for shield diameters greater than three inches and about ⅛ of an inch for shield diameters of three inches or less. The length of the shield 320 can vary but, preferably, the shield 320 will have a length ranging from six to thirty six inches; more preferably a length ranging from sixteen to thirty inches; and, most preferably, a length ranging from eighteen to twenty four inches.

In use, the shield 320 is simply passed over the free end of the line housed within a conduit and slipped into the conduit with the upper flange 322 of the shield keeping the shield from falling down into the conduit. With the lower end of the conduit extending down beyond the location where the conduit needs to be cut to trim the conduit to their proper height, the circumferential cut is made in the conduit severing the upper end of the conduit from the remainder of the conduit. With the vertical riser or conduit cut to the desired height, the upper severed section of the conduit along with the shield 320 are removed from the about the cable by sliding the severed section of conduit and the shield off of the free end of the cable.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A shield for protecting a power or communication line within a conduit from damage and workers from electrical shock when a portion of the conduit housing the line is being cut away to expose the line wherein the conduit has an internal diameter and a longitudinal centerline and the line has an external diameter and a longitudinal centerline, comprising:

a tubular shield having a longitudinal centerline; the tubular shield having a tubular sidewall with an internal surface and an external surface; at least one of the sidewall surfaces being an electrically nonconductive material to insulate workers from the line; the tubular shield having an internal diameter at least one quarter of an inch greater than the external diameter of the line so that the line can be received within the shield and the shield can be rotated relative to and moved over the line in the direction of the longitudinal centerline of the line; and the shield having an external diameter at least one quarter of an inch less than the internal diameter of the conduit so that the tubular shield can be easily rotated within the conduit and moved within the conduit in the direction of the longitudinal axis of the conduit to position the shield within the conduit to protect the line when a section of the conduit is cut out of the conduit to expose the line.

2. The shield for protecting a power or communication line according to claim 1, wherein:

the tubular shield has a longitudinally extending slot extending for the entire length of the tubular shield; the slot having a width at least one quarter of an inch greater than the external diameter of the line so that the line can pass through the slot into and out of the shield.

3. The shield for protecting a power or communication line according to claim 2, wherein:

the portion of the tubular shield forming the external surface of the tubular shield is made of a harder material than the conduit to better resist cutting than the conduit.

4. The shield for protecting a power or communication line according to claim 2, wherein:

the tubular shield has a tubular metallic core encased within the electrically nonconductive material.

5. The shield for protecting a power or communication line according to claim 4, wherein:

the tubular core is made of aluminum.

6. The shield for protecting a power or communication line according to claim 2, wherein:

the tubular shield is made substantially entirely of the electrically nonconductive material.

7. The shield for protecting a power or communication line according to claim 2, wherein:

the tubular shield has an outwardly projecting annular flange, extending substantially perpendicular to the longitudinal centerline of the tubular shield, at a first end of the tubular shield; the annular flange is interrupted by the slot; and the flange having an external dimension in the direction perpendicular to the longitudinal center line of the tubular shield that is greater than the internal diameter of the conduit.

8. The shield for protecting a power or communication line according to claim 1, wherein:

a portion of the tubular shield, forming the external sidewall surface of the tubular shield, is made of a harder material than the conduit to better resist cutting than the conduit.

9. The shield for protecting a power or communication line according to claim 1, wherein:

the tubular shield has a tubular metallic core encased within the electrically nonconductive material.

10. The shield for protecting a power or communication line according to claim 1, wherein:

the tubular shield is made substantially entirely of the electrically nonconductive material.

11. The shield for protecting a power or communication line according to claim 1, wherein:

the tubular shield has an opening in the tubular sidewall of the shield passing from the exterior surface to the interior surface of the tubular sidewall.

12. The shield for protecting a power or communication line according to claim 1, wherein:

the tubular shield has an outwardly projecting annular flange, extending substantially perpendicular to the longitudinal centerline of the tubular shield, at a first end of the tubular shield; and the flange having an external dimension in the direction perpendicular to the longitudinal center line of the tubular shield that is greater than the internal diameter of the conduit.

13. The shield for protecting a power or communication line according to claim 12, wherein:

the flange has openings therein for gripping the tubular shield by the flange.

14. A method for exposing a power or communication line housed within a conduit wherein the conduit has an internal diameter and a longitudinal centerline and the power line has an external diameter and a longitudinal centerline, comprising:

cutting a first longitudinally extending slot into an upper portion of the conduit, the first conduit slot having a width greater than the external diameter of the line so that the power or communication line can pass through the first conduit slot;

providing a tubular shield having a longitudinally extending slot extending for the entire length of the tubular shield; the shield slot having a width greater than the diameter of the line so that the line can pass through the shield slot into and out of the tubular shield; and the tubular shield having an external diameter less than the internal diameter of the conduit so that the tubular shield can be inserted into the conduit through the first conduit slot, easily rotated within the conduit to pass between the line housed within the conduit and the conduit, and moved longitudinally within the conduit to position the tubular shield to protect the line when a section of the conduit is cut out of the conduit to expose the line;

inserting the tubular shield into the first conduit slot and rotating the tubular shield within the conduit to pass the line into the tubular shield through the shield slot and the shield intermediate the line and the conduit;

cutting the conduit circumferentially at two spaced apart locations with the tubular shield intermediate the conduit and the line to separate a first section of the conduit from the remainder of the conduit; and removing the first conduit section with the tubular shield from about the line by passing the line through the shield slot and the first conduit slot to expose the line.

15. The method for exposing a power or communication line housed within a conduit according to claim 14, wherein:

the tubular shield has an external diameter one quarter of an inch or more less than the internal diameter of the conduit.

16. The method for exposing a power or communication line housed within a conduit according to claim 14, wherein:

the tubular shield has a tubular metallic core encased within an electrically nonconductive material.

17. The method for exposing a power or communication line housed within a conduit according to claim 14, wherein:

the tubular shield is made substantially of an electrically nonconductive material.

18. The method for exposing a power or communication line housed within a conduit according to claim 14, wherein:

a portion of the tubular shield, forming the external sidewall surface of the tubular shield, is made of a harder material than the conduit to better resist cutting than the conduit.

19. The method for exposing a power or communication line housed within a conduit according to claim 14, including:

cutting a second longitudinally extending slot into an upper portion of the conduit with the slot beginning at an open end of the conduit; the second conduit slot having a width greater than the external diameter of the line so that the power or communication line can pass through the second conduit slot;

providing a second tubular shield having a longitudinally extending slot extending for the entire length of the second tubular shield; the second shield slot having a width greater than the diameter of the line so that the line can pass through the second shield slot into and out of the second tubular shield; and the second tubular shield having an external diameter less than the internal diameter of the conduit so that the second tubular shield can be inserted into the conduit, intermediate the line housed within the conduit and the conduit, and moved longitudinally within the conduit to position the second tubular shield to protect the line when a second section of the conduit is cut out of the conduit to expose more of the line;

passing the line into the second tubular shield through the second shield slot and inserting the second tubular shield into the open end of the conduit;

cutting the conduit circumferentially at a location spaced from the open end of the conduit, with the cut intersecting the second conduit slot and the second tubular shield intermediate the conduit and the line, to separate a second slotted section of the conduit from the remainder of the conduit; and removing the second conduit section with the second tubular shield from about the line by passing the line through the second shield slot and the second conduit slot in the second conduit section to expose the line.

20. The method for exposing a power or communication line housed within a conduit according to claim 14, including:

severing the line where the line has been exposed;

cutting a second longitudinally extending slot in the upper portion of the conduit at a location spaced from the location of first conduit slot; the second conduit slot having a width greater than the external diameter of the line so that the power can pass through the second conduit slot;

providing a second tubular shield; the second tubular shield having an internal diameter greater than the external diameter of the line so that the line can be received within the second tubular shield moved over the line; the second tubular shield having an external diameter less than the internal diameter of the conduit so that the second tubular shield can be inserted into an open end of the conduit and moved longitudinally within the conduit to position the second tubular shield to protect the line when a second section of the conduit is cut out of the conduit to expose the line at a second location;

passing a free end of the line into the second tubular shield and inserting the second tubular shield into an open end of the conduit;

cutting the conduit circumferentially at the location of the second conduit slot with the cut intersecting the second conduit slot and the second tubular shield intermediate the conduit and the line, to separate a second slotted section of the conduit from the remainder of the conduit; and removing the second conduit section from about the line by moving the second tubular shield into the remaining conduit and passing the line through the second conduit slot in the second conduit section to expose the line.

21. A method for exposing a power or communication line housed within a generally vertically extending conduit wherein the conduit has an internal diameter and a longitudinal centerline and the power line has an external diameter, a longitudinal centerline, and a free end extending from an open end of the conduit, comprising:

providing a tubular shield; the tubular shield having an internal diameter greater than the external diameter of the line so that the line can be received within the tubular shield and the tubular shield can be moved longitudinally over the line; the tubular shield having an external diameter less than the internal diameter of the conduit so that the tubular shield can be inserted into the open end of the conduit and moved longitudinally within the conduit to position the tubular shield to protect the line when a section of the conduit is cut off of the conduit; the tubular shield having an outwardly extending flange at one end that has an external dimension greater than the internal diameter of the conduit so that the tubular shield can not completely pass down into the conduit;

passing a free end of the line into the tubular shield and inserting the tubular shield into the open end of the conduit;

cutting the conduit circumferentially at a location spaced from the open end of the conduit with the tubular shield intermediate the conduit and the line, to separate a section of the conduit from the remainder of the conduit; and removing the conduit section and the tubular shield from about the line.

* * * * *